United States Patent [19]

St. Cyr

[11] 3,853,826
[45] Dec. 10, 1974

[54] HIGH PIPERYLENE RESIN WITH BORON CATALYST

[75] Inventor: David R. St. Cyr, Uniontown, Ohio

[73] Assignee: The Goodyear Tire & Rubber Company, Akron, Ohio

[22] Filed: Sept. 14, 1973

[21] Appl. No.: 397,469

Related U.S. Application Data

[63] Continuation of Ser. No. 192,651, Oct. 26, 1971, abandoned.

[52] U.S. Cl.................... 260/80.7, 260/5, 260/82, 260/85.3 R, 260/94.2 R
[51] Int. Cl....... C08f 3/16, C08f 15/04, C08f 15/40
[58] Field of Search.... 260/80.7, 82, 85.3 R, 94.2 R

[56] References Cited
UNITED STATES PATENTS

| | | | |
|---|---|---|---|
| 2,581,154 | 1/1952 | Walsh et al. | 260/85.3 |
| 3,505,300 | 4/1970 | Galloway | 260/80.7 |
| 3,509,239 | 4/1970 | Tindall | 260/889 |
| 3,541,188 | 11/1970 | Spail | 260/889 |
| 3,577,398 | 5/1971 | Pace et al. | 260/85.3 |

Primary Examiner—Stanford M. Levin
Attorney, Agent, or Firm—F. W. Brunner; H. C. Young, Jr.

[57] ABSTRACT

There is disclosed a hydrocarbon derived resin having the structure characterized by a softening point in the range of about 10°C. to about 40°C. and comprising from about 80 to about 100 percent units derived from piperylene and correspondingly up to about 20 weight percent units derived from 2-methyl-2-butene prepared by the method which comprises polymerizing a mixture which comprises from about 75 to about 100 weight percent of piperylene and up to about 25 weight percent of 2-methyl-2-butene at a temperature in the range of about −10°C. to about 50°C. in the presence of an anhydrous catalyst selected from the group consisting of boron trifluoride and a boron trifluoride etherate having from about 2 to about 12 carbon atoms. The resin unexpectedly has a relatively narrow molecular weight throughout its softening point range and can be prepared with a relatively controlled softening point. The resin has particular utility when combined as an admixture with rubber to form pressure sensitive adhesives.

5 Claims, No Drawings

HIGH PIPERYLENE RESIN WITH BORON CATALYST

This is a continuation of application Ser. No. 192,651, filed Oct. 26, 1971, now abandoned.

This invention relates to new synthetic resins and to a method of preparing such resins.

Liquid resins with softening points below about 30°C. have unique utility for many commercial applications. They can be particularly useful for the preparation of pressure sensitive adhesives if they should also have good tackifying properties. Therefore, such resins having a combination of these qualities are highly desirable and are sought after.

Many unsaturated hydrocarbons polymerize in the presence of metal halide catalysts to produce resins having various physical properties. Some even produce rubbery polymers, some produce tackifying polymers having high softening points whereas other monomers produce only oil products.

For example, 2-methyl-2-butene has been taught to form low molecular weight oily products. Surprisingly, copolymers of piperylene and 2-methyl-2-butene have been found to provide useful tackifying resins having relatively high softening points in the range of about 80°C. to about 110°C. (U.S. Pat. No. 3,577,398) when formed with aluminum chloride.

However, it has now been found unexpectedly that hydrocarbon mixture comprising primarily piperylene can be polymerized in the presence of certain types of catalysts to form commercially useful liquid tackifying resins. These resins are physically different from the copolymer structure which were prepared by copolymerizing with 2-methyl-2-butene in the presence of aluminum chloride having its characteristic high softening point.

In accordance with this invention, it has been discovered that a hydrocarbon derived resin with a structure characterized by having a relatively low softening point in the range of about 10°C. to about 40°C. and preferably in the range of about 15°C. to about 25°C., is prepared by polymerizing a mixture comprising from about 75 to about 100 weight percent of piperylene and up to about 25 weight percent of 2-methyl-2-butene in the presence of an anhydrous metal halide catalyst selected from boron trifluoride and boron trifluoride etherate prepared from boron trifluoride and an ether having from 2 to 12 carbon atoms. It is preferred that the mixture to be polymerized comprises from about 90 to about 100 weight percent of piperylene and up to about 10 weight percent of 2-methyl-2-butene.

The desired resinous materials are prepared essentially from piperylene, although they can have the backbone of piperylene/2-methyl-2-butene. They can comprise from about 80 to about 100 weight percent units derived from piperylene and up to about 20 weight percent units derived from 2-methyl-2-butene and preferably from about 95 to about 100 percent from piperylene and correspondingly up to about 5 percent from 2-methyl-2-butene. Thus, although the piperylene in the mixture has a relatively higher reactivity, most of any 2-methyl-2-butene does apparently go into the resin, probably because such a small amount is present.

The resins of this invention, in addition to their definitive softening point range, may further be characterized by having a viscosity in the range of from about 400 to about 60,000 and preferably from about 500 to about 40,000 centipoises at about 25°C. depending somewhat upon the piperylene content, the degree of stripping of the resin product to remove light oil-like products and unreacted hydrocarbons. This reference to degree of stripping is not intended to be misleading or confusing. Typically, a major portion of the polymerization product is the resin of this invention whereas a minor portion consists of oil-like products. Reference is made to the degree of stripping because of the sensitivity of viscosity to small amounts of low viscosity of the oil-like products and unreacted hydrocarbons. Thus, it is usually desired to remove at least about 95 weight percent of such materials from the resin product.

In the practice of this invention, about 40 to about 80, preferably 50 to about 75, weight percent of the piperylene/2-methyl-2-butene mixture is converted to the resin of this invention, correspondingly from about 50 to about 25 weight percent is converted to dimers, trimers and low molecular weight oil polymers with the remainder being usually less than 5 weight percent essentially unreacted. Thus, a major portion of the monomer is typically converted to the resin.

Further typical characterizations of the resins of this invention are a Gardner color of about 2 to about 8, an acid number of from about 0.6 to about 1.5, a saponification number of from about 7 to about 25, and a specific gravity of from about 0.85 to about 1.0. The characteristic softening point is determined by ASTM Method E-28-58T required to be modified by first cooling the sample and its bath appropriately below room temperature, and then gradual heating to the resin's softening point.

The boron trifluoride etherate catalyst is of the type derived from boron trifluoride and an ether having from 2 to about 12, and preferably from 2 to about 6, carbon atoms. The boron trifluoride etherate is generally represented by the formula:

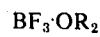

$$BF_3 \cdot OR_2$$

Representative of various ethers for preparation of the etherate are those having the structure ROR', where R and R' are individually selected from saturated alkyl radicals having from 1 to about 6, and preferably from 1 to about 3, carbon atoms, such as methyl, ethyl, n-propyl, isopropyl, n-butyl, isobutyl, sec.-butyl, 5-butyl, n-pentyl, isopentyl, t-pentyl, isohexyl, n-hexyl and 5-hexyl radicals. The catalyst is typically prepared by mixing boron trifluoride with an ether in a mole ratio in the range of about 1 to about 1, at a temperature in the range of about −25°C. to about 25°C., and usually in the range of about 10°C. to about 25°C. Representative of various ethers are dimethyl ether, diethyl ether, methyl ethyl ether, di-n-propyl ether, diisopropyl ether, di-n-butyl ether, diisobutyl ether, di-t-butyl ether, d-n-amyl ether, diisoamyl ether, di-t-amyl ether, ethyl amyl ether, diisohexyl ether, di-n-hexyl ether, di-t-hexyl ether and butyl(2-ethyl hexyl)ether. Diethyl ether is usually preferred.

In carrying out the polymerization reaction, the catalyst may be added to the hydrocarbon mixture or the hydrocarbon mixture may be added to the catalyst. If the catalyst is boron trifluoride, it is usually added to the hydrocarbon mixture in its gaseous form. If desired, the catalyst and mixture of hydrocarbons can be added simultaneously or intermittently to a reactor. The reaction can be conducted continuously or by batch process techniques generally known to be those skilled in the art. The amount of catalyst is not of primary importance, although a sufficient amount must be used to cause the polymerization reaction to occur.

The reaction is conveniently carried out in the presence of a diluent because it is usually exothermic. However, with adequate mixing and cooling, the temperature can be controlled and the reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction mixture. It is understood that unreacted reactants can also act as diluents.

A wide range of temperatures can be used for the polymerization reaction. The polymerization can be carried out at temperatures in the range of from about −50°C. to about 50°C. preferably about 10°C. to about 35°C., although a satisfactory reaction can normally be carried out to produce the resin of this invention at a temperature in the range of from about 0°C. to about 50°C. The polymerization reaction pressure may be atmospheric or above or below atmospheric pressure. Typically, a satisfactory polymerization can be conducted when the reaction is carried out at about autogenous pressure developed by the reactants under the operating conditions used. The time of the reaction is not generally of primary importance and can vary from a few seconds to 12 hours or more.

The polymerizate is typically distilled by steam stripping, for example, to remove the light oil-like materials and unreacted hydrocarbons to yield the product resin. The resulting resins of this invention are generally soluble in aliphatic hydrocarbons, such as pentane, hexane and heptane and in aromatic hydrocarbons, such as benzene and toluene.

The low softening point polymers or resins of this invention can be modified so long as they maintain their piperylene or piperylene/2-methyl-2-butene backbone by the addition of up to about 20 parts by weight of piperylene dimers or piperylene trimers or other unsaturated hydrocarbons containing from 4 to 6 carbon atoms, and mixtures thereof to 100 parts by weight of the piperylene/2-methyl-2-butene monomer mixture. Representative examples of such hydrocarbons are butene and substituted butenes, such as 2-methyl-1-butene, 2,3-dimethyl-1-butene, 2,3-dimethyl-2-butene, 3,3-dimethyl-1-butene; the pentenes and substituted pentenes, such as 1-pentene, 2-pentene, 2-methyl-1-pentene, 2-methyl-2-pentene, 3-methyl-2-pentene, 4-methyl-1-pentene; 4-methyl-2-pentene, the hexenes, such as 2-hexene; diolefins, such as isoprene, and cyclic unsaturated hydrocarbons, such as cyclopentene, cyclohexene and 1,3-cyclopentadiene.

In practice, the liquid resins of this invention can comprise up to about 15 weight percent units derived from the described addition of up to about 20 parts by weight to the monomer mixture of piperylene dimers, piperylene trimers, and the other unsaturated hydrocarbons containing from 4 to 6 carbon atoms heretofore mentioned in addition to the required backbone of the units derived from piperylene and from 2-methyl-2-butene.

These prepared resinous materials are useful as modifiers for natural rubber and various synthetic rubbers. Representative of such synthetic rubbers are butadiene-styrene copolymers, butadiene-acrylonitrile copolymers and stereospecific polymers of dienes, such as butadiene and isoprene. The resins are usually desirable as extenders and tackifiers in such elastomeric materials and especially where resins are desired which have a light color. They are particularly useful when combined as an admixture with natural rubber or various synthetic rubbers to form pressure sensitive adhesives. They can also be blended with other higher softening point resins for these purposes.

The following examples further illustrate the invention and are not intended to be limiting. In these examples, parts and percentages are by weight unless otherwise indicated.

EXAMPLE I

To a suitable reactor was charged 100 parts of heptane and 4 parts of boron trifluoride ethyl etherate. To this mixture was then added 200 parts of piperylene over a period of time of about 90 minutes while keeping the reaction temperatures ab about 30°C. The mixture was stirred and allowed to react for an additional hour. The catalyst was neutralized with 60 parts of water and 60 parts of methanol. An emulsion tended to form but was broken by evaporation of the water and adding a small amount of additional heptane. The resulting mixture was filtered through an asbestos Celite filter and the filtrate distilled to 250°C. under a nitrogen atmosphere. The undistilled portion of the product was a yield of 152 parts of a very viscous polymer having a viscosity of about 38,600 centipoises (cps) at 41°C.

Analysis of the piperylene used for this example was as indicated in Table 1.

Table 1

| | |
|---|---|
| 1 trans 3 pentadiene | 72.51 |
| 1 cis 3 pentadiene | 25.78 |
| Cyclopentene | 0.83 |
| Unknown | 0.88 |

EXAMPLE II

In a suitable reactor was polymerized 200 parts of a hydrocarbon mixture according to the procedure of Example I. The yield was 190 parts of a viscous yellow polymer having a viscosity at about 588 cps at 41°C.

Analysis of the hydrocarbon mixture used was as follows in Table 2.

Table 2

| | |
|---|---|
| 1 trans 3 pentadiene | 61.89 |
| 1 cis 3 pentadiene | 21.08 |
| 2 methyl 2-butene | 15.98 |
| Cyclopentene | 0.78 |
| Unknown | 0.27 |

While certain representative embodiments and details have been shown for the purpose of illustrating the invention, it will be apparent to those skilled in this art that various changes and modifications may be made therein without departing from the spirit or scope of the invention.

I claim:

1. A hydrocarbon derived resin having the structure characterized by softening point in the range of about 10°C to about 40°C and comprising from about 95 to about 100 weight percent units derived from piperylene and correspondingly up to about 5 weight percent units derived from 2-methyl-2-butene prepared by the method which comprises polymerizing a mixture which comprises from about 90 to about 100 weight percent of piperylene and up to about 10 weight percent of 2-methyl-2-butene at a temperature in the range of about 0°C to about 50°C in the presence of an anhydrous catalyst selected from the group consisting of boron trifluoride and a boron trifluoride etherate derived from boron trifluoride and an ether selected from dimethyl ether, diethyl ether, methyl ethyl ether, di-n-propyl ether, diisopropyl ether, di-n-butyl ether, diisobutyl ether, di-t-butyl ether, di-n-ether, diisoamyl ether, di-t-amyl ether, diisohexyl ether, di-n-hexyl ether, di-t-hexyl ether and butyl (2-ethyl hexyl) ether.

2. The hydrocarbon derived resin of claim 1 having the softening point in the range of about 10°C to about 40°C. and modified by containing up to about 15 weight percent units derived from compounds selected from piperylene dimers, piperylene trimers and other unsaturated hydrocarbons containing from 4 to 6 carbon atoms, said modification accomplished by modifying the polymerization mixture with the addition of up to about 20 parts by weight of the compound selected from piperylene dimers, piperylene trimers and other unsaturated hydrocarbons containing from 4 to 6 carbon atoms to 100 parts by weight of the piperylene/2-methyl-2-butene monomer mixture.

3. The hydrocarbon derived resin of claim 2 wherein the said other unsaturated hydrocarbon containing from 4 to 6 carbon atoms comprise primarily monomers selected from butene, 2-methyl-1-butene, 2,3-dimethyl-1-butene, 2,3-dimethyl-2-butene, 3,3-dimethyl-1-butene, 1-pentene, 2-pentene, 2-methyl-1-pentene, 2-methyl-2-pentene, 3-methyl-2-pentene, 4-methyl-1-pentene, 4-methyl-2-pentene, 2-hexene, isoprene, cyclopentene, cyclohexene and 1,3-cyclopentadiene.

4. The hydrocarbon-derived resin of claim 1 where the catalyst is selected from boron trifluoride and a boron trifluoride etherate derived from boron trifluoride and diethyl ether.

5. The hydrocarbon derived resin of claim 4 prepared by polymerizing the monomer mixture at a temperature in the range of about 10°C. to about 35°C. in the presence of an inert diluent selected from aliphatic hydrocarbons, aromatic hydrocarbons and unreacted residual hydrocarbons from the reaction mixture.

* * * * *